March 18, 1952    F. E. BACHMAN    2,590,062
BRAKE HEAD MOUNTING
Filed July 5, 1946    2 SHEETS—SHEET 1

*INVENTOR.*
FRED E. BACHMAN
BY
ATTORNEY

March 18, 1952 F. E. BACHMAN 2,590,062
BRAKE HEAD MOUNTING
Filed July 5, 1946 2 SHEETS—SHEET 2
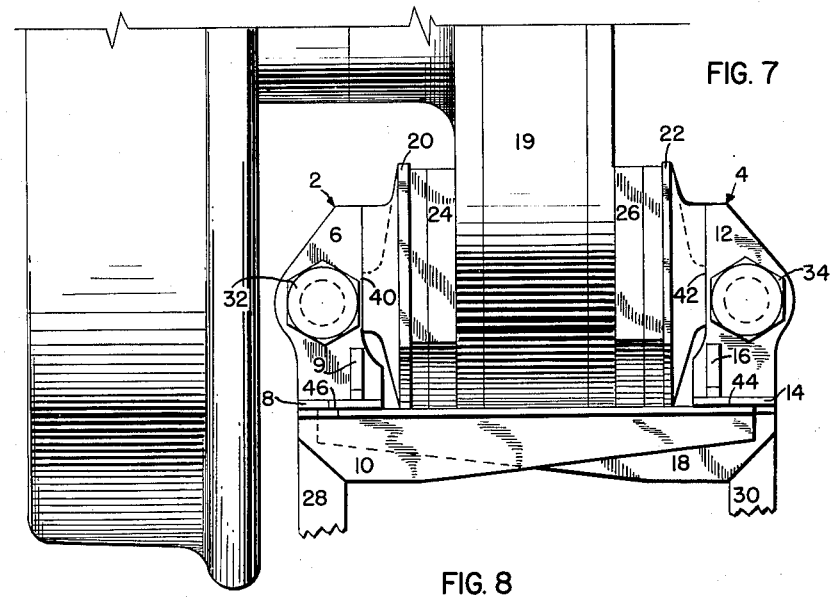
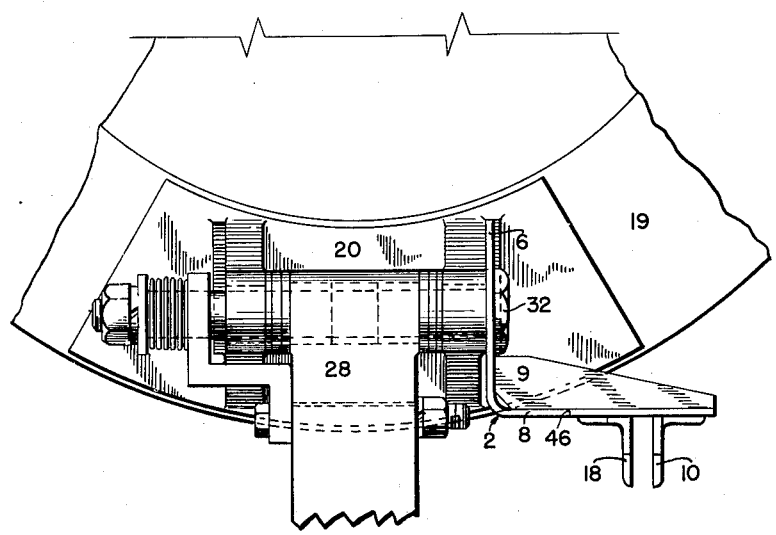
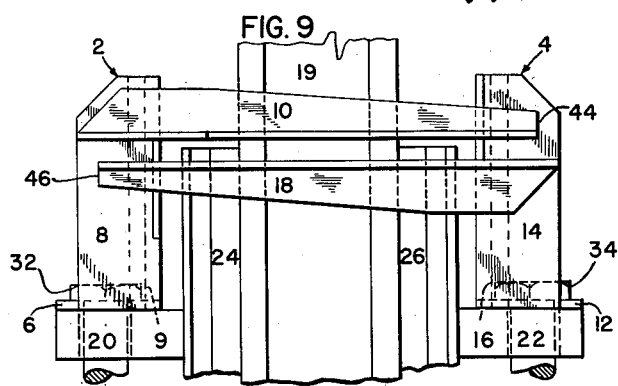
INVENTOR.
FRED E. BACHMAN
BY
ATTORNEY

Patented Mar. 18, 1952

2,590,062

UNITED STATES PATENT OFFICE 2,590,062

BRAKE HEAD MOUNTING

Fred E. Bachman, Chicago, Ill., assignor to American Steel Foundries, Chicago, Ill., a corporation of New Jersey Application July 5, 1946, Serial No. 681,567

6 Claims. (Cl. 188—73)

My invention relates to railway rotor brake equipment and more particularly to mechanism for effecting even wear on brake shoes by automatically adjusting and rotating the brake heads and associated shoes when the shoes are in contact with the friction surfaces of a brake rotor, such mechanism being commonly known as brake head guides.

One object of my invention is to provide in a rotor brake assembly guides for spaced brake heads to obtain even wear on associated brake blocks by maintaining parallelism of their wearing surfaces through opposing rotation of the brake heads on their axes in one direction.

Another object of my invention is to provide in a rotor brake assembly brake head guides of simple construction which, when the brake head blocks are in frictional engagement with an associated brake rotor, progressively shift the high pressure area radially inward of said rotor, thereby overcoming the tendency of brake blocks wearing mostly on their outside or largest arc and least on their inner or smallest arc.

In the usual rotor brake assembly, a rotor with friction surfaces at opposite sides thereof is positioned between a pair of pivotally mounted brake heads, each carrying a shoe bearing upon one of the surfaces of the rotor.

In the assembly just described, I have provided a pair of novel brake head guides which, upon application of braking effort to said heads, so cooperate with each other and the heads upon which they are mounted as to cause even wear to occur on the associated brake shoes, whereby the life expectancy of each shoe is considerably prolonged.

These and other objects of my invention will be apparent from consideration of the specification and the drawings.

In the drawings, Figure 1 is a top plan view of my novel invention showing the upper brake head guide, Figure 2 being a side elevation thereof, and Figure 3 being an end view taken from the right as shown in Figure 1.

Figure 7 is a fragmentary top plan view of a rotor brake assembly showing an embodiment of my invention, Figure 8 being a side elevation thereof taken from the left, and Figure 9 being a fragmentary rear view taken from the bottom as seen in Figure 7 with the levers omitted.

It will be apparent to those skilled in the art that in a rotating annular brake rotor portions of the rotor which lie about its outer perimeter traverse a greater distance with respect to any other portions which lie closer to the center, and that ordinarily when brake shoes are brought in frictional engagemnt with the adjacent annular friction surfaces of the moving rotor, the brake shoes wear mostly in an area about their outer peripheries where the greatest pressures develop and most rubbing occurs. It is obvious that the pressure and the amount of rubbing, and consequently the amount of wear on the brake shoes, tapers radially inward.

Under the conditions stated above, the greatest wear on a new shoe occurs about its outer periphery. As wear takes place, my novel brake head guides progressively distribute and move the peak pressure radially inward toward the center of the rotor, thus producing even wear on the brake shoes.

Theoretically, balanced wear of a shoe could be obtained by fixing the center of pressure on a brake head and applying the peak pressure to this area. However, in reality it has been learned that the theoretical center of pressure cannot be so fixed, and that the center of pressure continually shifts due to varying unbalancing factors such as frictional heat causing uneven expansivity of the brake shoe and blistering of the metal forming the friction surfaces of the rotor. Because of the impossibility of fixing the center of pressure, the only other alternative is to take advantage of the positively established unbalanced wear tendency of the shoes and uitilize this tendency in distributing high pressures in a progressive manner across the face of the rotor with resultant even wear of the brake shoes. This I have done by my novel invention.

Figure 1:
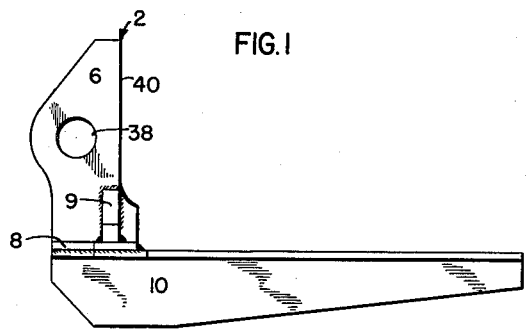
Figure 3:
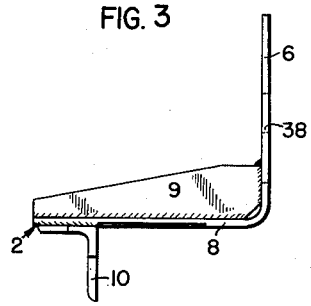
Figure 4:
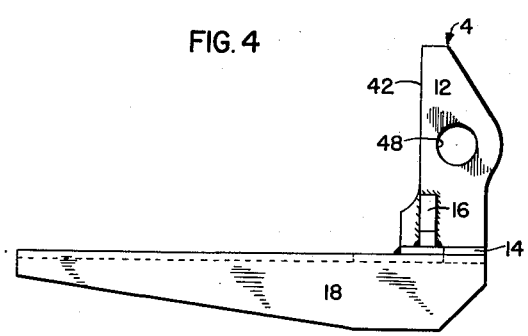
Figure 4 is a top plan view of my lower brake head guide, Figure 5 being a side elevation thereof, and Figure 6 being an end view taken from the right as shown in Figure 4.
Figure 2:
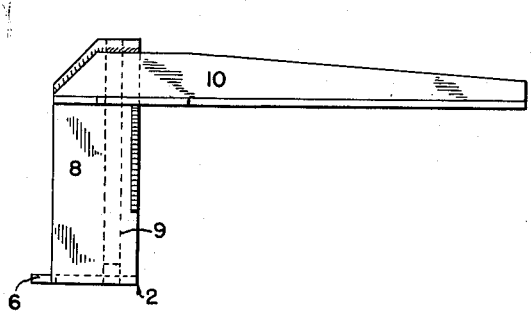

Referring to the figures in the drawings, it will be noted that my invention consists of two principal parts, namely, an upper brake head guide 2 (Figure 1) and a lower brake head guide 4 (Figure 4). The upper guide 2 has a bracket portion 6 which is joined at its inner end to a transverse guide member 8, the juncture of these two being reinforced by the rib 9 (Figure 3). The back of the guide member 8 is fixed adjacent the top thereof to an L-section arm 10 extending laterally as shown in Figure 2.

Figure 6:
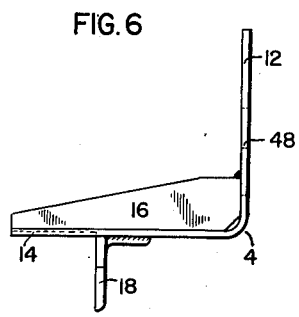
Figure 5:
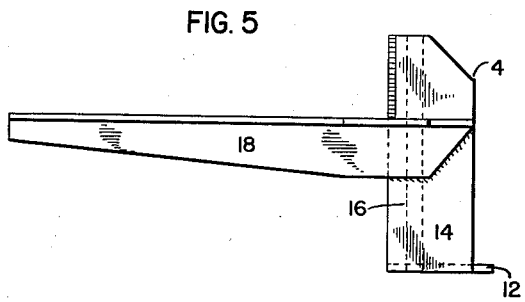

Similarly, the lower guide 4 (Figure 4) has a bracket portion 12 which is fixed at its inner end to a transverse guide member 14, the juncture of the bracket 12 and the member 14 being reinforced by the rib 16 (Figure 6). An L-section arm 18 is fixed on the back adjacent the midportion of said member 14, said arm extending laterally as shown in Figure 5.

The invention is illustrated in Figure 7 in connection with a rotor brake assembly having the usual rotor 19 and spaced stators comprising brake heads 20 and 22 carrying respective brake shoes 24 and 26 to which braking effort is applied by suitable brake mechanism including oppositely arranged pivotally mounted brake levers 28 and 30 to which the brake heads 20 and 22 respectively are pivotally fastened by pins 32 and 34. The brake head guides 2 and 4, which are oppositely arranged, have their respective bracket portions 6 and 12 seated upon the brake heads 20 and 22. Bracket 6 or guide 2 has a central opening 38 (Figure 1) for reception of said pin 32 which secures the guide 2 to said brake head 20. It will be noted that the edge 40 of bracket 6 rests securely against the adjacent back of the brake head 20 so that the guide 2 and brake head 20 are fixed to move pivotally together.

Similarly, bracket 12 of guide 4 has a central opening 48 (Figure 4) through which extends pin 34 and secures guide 4 to brake head 22 while the edge 42 of bracket 12 bears against the adjacent back of brake head 22.

After securing the brake head guides 2 and 4 to their respective brake heads 20 and 22, it will be noted that the free end of arm 10 rests against the back of the guide member 14 as at 44 (Figure 7 and 9) and that the free end of arm 18 rests against the back of the guide member 8 as at 46. This cooperative arrangement of the guides 2 and 4 permits brake head 20 to rotate freely in a clockwise direction and prevents its rotation in a counterclockwise direction. Simultaneously brake head 22 is allowed freedom of rotation in a counterclockwise direction and is restricted in rotating in a clockwise direction. With this arrangement, upon application of braking effort to the heads, parallelism of the wearing surfaces of the shoes 24 and 26 is maintained. As wear takes place the peak pressure is removed from the portions of the brake shoes where most wear would normally take place, said guides progressively shifting the peak pressure area radially inward of the rotor as a result of which the brake shoes wear evenly. This shifting of the pressures occurs in the following manner. Wear occurs on the friction shoes more rapidly in the areas adjacent their radially outer peripheries than in the areas adjacent their radially inner peripheries. This is due to the fact that the portions of the rotor further from its axis of rotation move at a faster rate than the portions closer to the axis of rotation of the rotor. Inasmuch as the guides maintain the brake shoes parallel to each other, the wear progresses and therefore the peak pressure areas shift from the radially outer extremities of the brake shoes to their radially inner extremities. After the wear is equalized across the face of the shoe, the wear again commences at the radially outer extremities of the shoes and again progresses across the faces of the shoes toward their radially inner extremities.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake arrangement, a rotor with friction surfaces at opposite sides thereof, brake heads, brake shoes mounted upon respective heads and bearing upon respective surfaces, a plurality of oppositely arranged levers, guiding means superposed on respective heads, and pins pivotally connecting said heads to said levers and rigidly securing said means to said heads, said means operatively engaging each other for limiting rotation of said heads relative to their respective levers.

2. In a brake arrangement, spaced brake levers, a rotor therebetween, a stator at each side of said rotor, pivot means connecting each stator to the adjacent lever on a substantially vertical axis, and guide elements each connected by said pivot means to the associated stator, said guide elements being arranged to control pivotal movement of the respective stators in one direction only, each element comprising a guide portion spaced laterally of a vertical plane passing through both pivot means and extending substantially parallel to said plane, each element having an arm engaging the guide portion of the other element on a side remote from said pivot means.

3. In a brake arrangement, a brake rotor, spaced levers, stators carried thereby, a guide associated with each stator, a pin interconnecting each guide, associated stator and lever, each guide engaging the other to limit rotation of the related stator, the areas of engagement between the guides being disposed to intersect planes through the pin axes.

4. A brake arrangement according to claim 1 in which, each guide means comprises a bracket portion bearing against the back of the associated head, a guide portion, and an arm portion, the arm portion on one guide means engaging the guide portion on the other guide means.

5. A brake arrangement according to claim 4 in which, each guide portion is formed with a guide surface disposed at one side of the axis of pivot of the associated brake head substantially in alignment therewith in a plane extending substantially parallel to the plane of said rotor.

6. A brake arrangemenent according to claim 1 in which, each guiding means is sleeved on its respective pin.

FRED E. BACHMAN.

REFERENCES CITED

The following references are of record in the file of this patent:

UNITED STATES PATENTS

| Number | Name | Date |
|---|---|---|
| 1,037,122 | Buffinger et al. | Aug. 27, 1912 |
| 1,392,368 | Streib | Oct. 4, 1921 |
| 1,704,883 | Cullinan | Mar. 12, 1929 |
| 1,724,795 | Djurson | Aug. 13, 1929 |
| 1,796,605 | Leggemann et al. | Mar. 17, 1931 |
| 2,197,785 | Busse | Apr. 23, 1940 |
| 2,228,818 | Eksergian | Jan. 14, 1941 |
| 2,383,375 | Eksergian et al. | Aug. 21, 1945 |
| 2,423,694 | Eksergian et al. | July 8, 1947 |